(12) United States Patent
Delmau et al.

(10) Patent No.: US 6,312,653 B1
(45) Date of Patent: Nov. 6, 2001

(54) METHOD FOR SEPARATING ACTINIDES AND LANTHANIDES BY LIQUID-LIQUID EXTRACTION USING CALIXARENES

(75) Inventors: Laetitia Delmau, Marseille; Nicole Simon; Jean-François Dozol, both of Pierrevert; Bernard Tournois, Vinon sur Verdon; Christine Roussin-Bouchard, Sisteron; Serge Eymard, Peyrois, all of (FR); Volker Böhmer; Cordula Grüttner, both of Allemagne (DE); Alexander Shivanyuk, Jyväskylä (FI); Christian Musigmann, Allemagne (DE)

(73) Assignee: Commissariat A l'Energie Atomique, Paris (FR)

( * ) Notice: Subject to any disclaimer, the term of this patent is extended or adjusted under 35 U.S.C. 154(b) by 0 days.

(21) Appl. No.: 09/485,688

(22) PCT Filed: Aug. 24, 1998

(86) PCT No.: PCT/FR98/01839

§ 371 Date: Apr. 27, 2000

§ 102(e) Date: Apr. 27, 2000

(87) PCT Pub. No.: WO99/10545

PCT Pub. Date: Mar. 4, 1999

(30) Foreign Application Priority Data

Aug. 25, 1997 (FR) .................................................. 97 10614

(51) Int. Cl.[7] ............................. C22B 59/00; C22B 60/00
(52) U.S. Cl. ................................ 423/9; 423/10; 423/21.5; 210/638; 210/634
(58) Field of Search ..................... 423/9, 10, 21.5; 210/634, 638, 643

(56) References Cited

U.S. PATENT DOCUMENTS

| 5,607,591 | * | 3/1997 | Dozol et al. | ............... | 210/638 |
| 5,866,087 | * | 2/1999 | Dozol et al. | ............... | 423/9 |
| 5,926,687 | | 7/1999 | Dozol et al. | . | |

FOREIGN PATENT DOCUMENTS

| 432989 | * | 6/1991 | (EP) . |
| 04-91070 | * | 3/1992 | (JP) . |
| 62-28032 | * | 8/1994 | (JP) . |
| 94/24138 | * | 10/1994 | (WO) . |
| 96/23800 | * | 8/1996 | (WO) . |
| 97/17322 | * | 5/1997 | (WO) . |

OTHER PUBLICATIONS

Dozol, et al., "Extraction and transport of radioactive . . . " Value Adding Solvent Extr., [Pap. ISEC '96] vol. 2, 1996, no month, pp. 1333–1338.*

Arnaud–Neu, et al., "Calixarenes with diphenylphosphorylacetamide . . . " J. Chem. Soc., Perkin Trans. 2, (6), 1996, no month, 1175–1182.*

Delmau, et al., "CMPO substituted calix[4]arenes, extractants . . . " Chem. Commun. (16) 1998, no month, 1627–8.*

* cited by examiner

Primary Examiner—Steven Bos
(74) Attorney, Agent, or Firm—Oblon, Spivak, McClelland, Maier & Neustadt, P.C.

(57) ABSTRACT

The invention involves a process for separating actinides and lanthanides by liquid-liquid extraction by means of calixarenes.

These calixarenes have the formula:

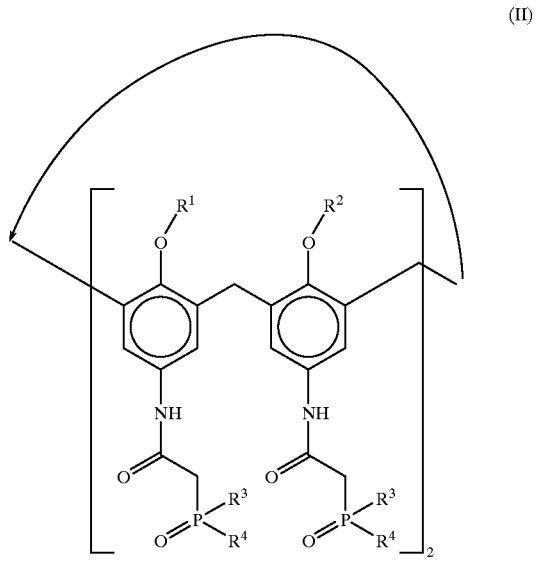

(II)

with $R^1$ and $R^2$ being alkyl groups or o-nitrophenoxy alkyl groups and $R^3$ and $R^4$ being aryl groups, and they are used in an organic liquid phase containing an organic diluent. The diluent and the calixarene concentration of the organic phase are chosen so as to ensure an enrichment of the organic phase with the actinide(s) and/or lanthanide(s) to be separated from an aqueous acid or saline solution.

13 Claims, 4 Drawing Sheets

METHOD FOR SEPARATING ACTINIDES AND LANTHANIDES BY LIQUID-LIQUID EXTRACTION USING CALIXARENES

FIELD OF THE INVENTION

This invention involves a process for separation of actinides and lanthanides from each other from an aqueous solution containing them.

Such solutions could be in particular aqueous solutions from used nuclear fuel treatment facilities, such as fuel dissolving solutions or aqueous effluents.

They could also be aqueous solutions from processing of rare earth, thorium and/or uranium ores.

More precisely, it involves separation of such metals by liquid-liquid extraction by means of calixarenes.

STATE OF THE PRIOR ART
Separation among lanthanides and actinides

In the former technique, liquid-liquid extraction processes were used to separate lanthanides among themselves by means of organic extractors such as di(2-ethylhexyl) phosphoric acid, amines, quaternary ammonium salts and tributyl phosphate, as described in Engineering Techniques J 6630-1 to J6630-8. The most selective extractor is di(2-ethylhexyl)phosphoric acid, which favours extraction of heavy lanthanides with low ionic radii.

Calixarenes substituted by acetamidophosphine oxide groups

The used of macrocyclic ligands such as calixarenes was also considered for extraction of actinides and lanthanides present in aqueous solutions as described in document FR-A-2 729 958.

The calixarenes used in this document have the formula:

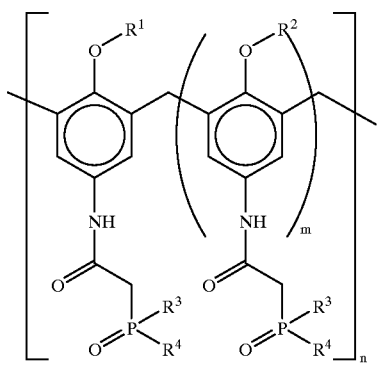

(I)

in which m is equal to 0 or 1, where
  n is a whole number from 2 to 8, with 4·(m+1)×n·8
    $R^1$ and $R^2$ which can be identical or different, are alkyl or o-nitrophenoxyalkyl groups, and
    $R^3$ and $R^4$ which can identical or different, are alkyl or aryl groups.

These calixarenes can be used to extract actinides and lanthanides from aqueous solutions from used nuclear fuel processing.

They are functionalised on their upper edges by acetamidophosphine oxide substituents which have good affinity for actinides and lanthanides and they are substituted on the lower edge by alkyl or o-nitrophenoxyalkyl groups.

For liquid-liquid extraction of actinides and lanthanides, these calixarenes are dissolved in an appropriate organic diluent such as nitrophenyl alkyl ethers, such as orthonitrophenyl hexyl ether.

Good extraction rates are obtained with such an organic diluent, but it is impossible to separate the actinides and lanthanides from each other.

Document JP-A-06/228032 describes the use of a mixture of chloroform and another organic solvent such as chlorobenzene or toluene to dissolve a calixarene in order to prepare calixarene films from the somution obtained.

SUMMARY OF THE INVENTION

The invention precisely involves a process for separating actinides and lanthanides by means of such calixarenes, according to which the diluent and the calixarene concentration are chosen in order to obtain a separation of the actinides and lanthanides from each other.

According to the invention, the process for separation of at least one metal M1 chosen in the group of actinides and lanthanides from at least one metal M2 chosen from the same group from an aqueous solution containing M1 and M2, includes the following steps:

a) putting the aqueous solution of the aforesaid metals M1 and M2 into contact with the organic liquid phase including
at least one calixarene with formula:

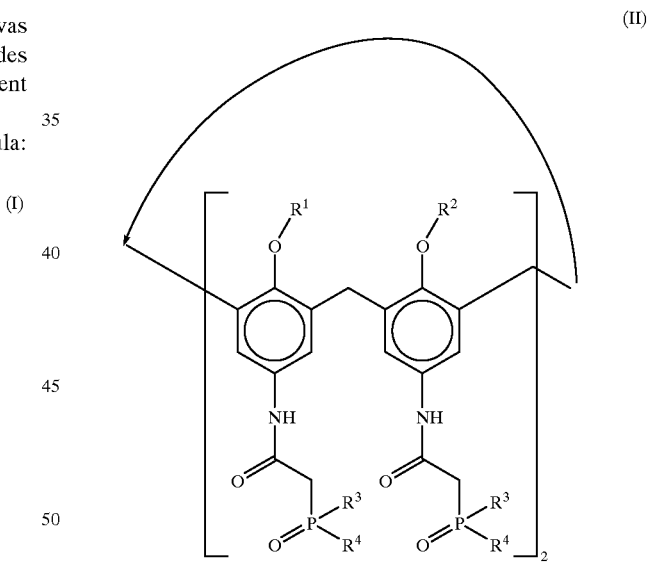

(II)

in which:
  $R^1$ and $R^2$ which can be identical or different, are alkyl or o-nitrophenoxyalkyl groups, and
  $R^3$ and $R^4$ which can identical or different, are aryl groups; and
  an organic diluent the aforesaid diluent and the calixarene concentration of the organic phase being chosen so that the distribution coefficient of the metal(s) M1 between this organic phase and the aforesaid aqueous solution is greater than 1 and the distribution coefficient of the metal(s) M2 between this organic phase and the aforesaid aqueous solution is less than 1; and b) separating the aforesaid aqueous solution from the aforesaid organic phase.

It should be remembered that the distribution coefficient of a metal M such as M1 or M2 is defined by the following formula:

$$D_M = \frac{[M]_{org,eq}}{[M]_{aq,eq}}$$

in which $[M]_{org,eq}$ corresponds to the concentration of the metal in the organic phase at equilibrium, and $[M]_{aq,eq}$ corresponds to the concentration of this same metal in an aqueous solution at equilibrium. For example, the extraction can be monitored by a radioactive tracer. This distribution coefficient D is determined with respect to the activity of the metal in the organic phase and the activity of the metal in the aqueous solution at equilibrium.

When D is greater than 1, the metal goes mostly into the organic phase; when D is less than 1, the metal remains mostly in the aqueous phase.

To separate various actinides and lanthanides by liquid-liquid extraction, the distribution coefficients of metals M1 to be extracted in the organic phase must be high with respect to those of metals M2 which must remain in the aqueous phase.

According to the invention, it was found that by choosing an appropriate organic diluent and by adjusting the calixarene concentration of the organic phase, a coefficient D greater than 1 could be obtained for certain elements and a coefficient D less than 1 for other elements, although this was practically impossible with the diluent used up until now, orthonitrophenyl alkyl ether.

The choice of diluent and calixarene concentration depend not just on the metals to be separated but also on the nature of the starting aqueous solution, as will be seen below.

According to the invention, the choice of organic diluent can in particular be made by determining the distribution coefficient $D_{Gd}$ of gadolinium between an organic phase composed of calixarene in solution in the diluent and an aqueous solution of gadolinium. In this case, the diluents which are suitable are those for which the distribution coefficient $D_{Gd}$ of gadolinium between the organic phase and the aqueous solution of gadolinium is from 0.5 to 5 when the calixarene concentration of the organic phase is from $10^{-4}$ to $10^{-3}$ mol/L.

Appropriate diluents could belong in particular to the group of heavy alcohols, for example with formula $C_nH_{2n}O$ with n·7, particularly with n from 7 to 13. Octanol and isotridecanol are examples of such alcohols. Chlorinated solvents such as chloroform, dichloromethane and 1,2-dichloroethane can also be used. Mixtures of diluents can also be used.

The calixarenes which can be used in the invention process are to be selected from those described in FR-A-2 729 958. Calixarenes which correspond to formula (II) above must be used, and particularly those of formula (II) in which $R^1$ and $R^2$ are alkyl groups of 3 to 18 carbon atoms and $R^3$ and $R^4$ are phenyl groups.

The following formula can be given by way of example of calixarenes which can be used:

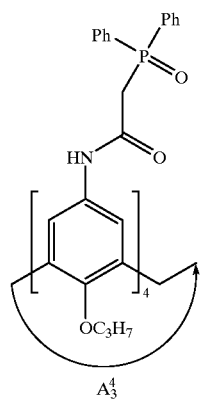

(III)

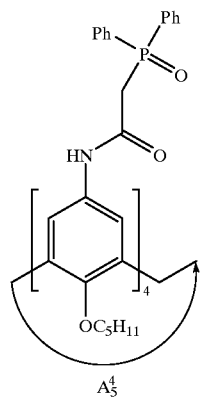

(IV)

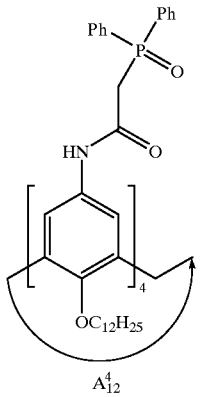

(V)

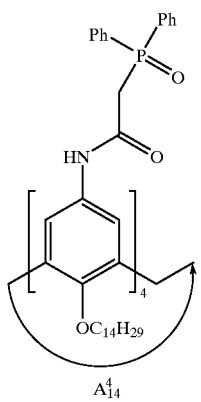

(VI)

in which Ph represents a phenyl group.

With the calixarenes used in the invention, the length of chain $R^1$ can vary because, as was seen, chain length has almost no influence on the extraction capacity of calixarene with respect to element of the lanthanide and actinide groups.

According to the invention, the calixarene concentration of the organic phase depends in particular on the organic diluent used. In general, calixarene concentrations are between $10^{-4}$ and $5 \cdot 10^{-2}$ mol/L.

The invention process can be used in the following manner.

First, the organic phase, which is immiscible in water, is prepared by dissolving calixarene in the diluent used, then the aqueous solution containing the metals to be separated is mixed in and stirred for at least 10 minutes at a temperature of 10° C. to 35° C. The two phases are then separated by centrifuging of the mixture at a speed of at least 2500 rotations/min, for example 3000 rotations/min, for about 5 minutes.

According to the invention, to improve the yield of extraction of the metal(s) M1 in the organic phase, the organic phase can be put in contact with the aqueous phase in several stages to enrich the organic phase with metal(s) M1 in each stage. After each contact, the organic liquid phase is separated from the aqueous solution. All of the operations can be done in classic liquid-liquid extraction devices such as mixer-settlers and centrifuge extractors.

After separation of the organic phase enriched with metal (s) M1, these metals can be retrieved in an aqueous re-extraction solution by putting the separated organic phase in contact with the aqueous re-extraction solution, followed by separation of the organic phase and the re-extraction solution. These operations can be done as before. The aqueous re-extraction solution is preferably an aqueous solution of a mineral acid with a pH·4.

Nitric acid solutions containing $10^{-4}$ to $10^{-1}$ mol/L of nitric acid, and particularly a $10^{-2}$ mol/L nitric acid solution can be cited as an example of an aqueous re-extraction solution.

The use of such an aqueous re-extraction solution is very advantageous with respect to use of an aqueous solution containing a complexing agent, such as the aqueous re-extraction solutions used on FR-A-2 729 958.

The aqueous re-extraction solution of the invention is non-complexing. It does not contain any organic compound such as the organic complexers used in FR-A-2 729 958 (methylene diphosphonic acid, oxalic acid, citric acid, oxalate or citrate); it has a very low mineral acid concentration and it is also economical.

Other characteristics and advantages of the invention will be clearer with a reading of the following description, given simply as an illustration and in no way limiting, with reference to the drawings in appendix.

DETAILED DESCRIPTION OF EMBODIMENTS OF THE INVENTION

In putting the invention process to use, an organic diluent and calixarene concentration which will allow for separation between metal(s) M1 and metal(s) M2 must be chosen.

For this purpose, the distribution coefficients of lanthanides and actinides are determined for the two following diluents:

chloroform, and octanol using various concentrations of calixarene in the organic phase, and an aqueous solution containing for example $10^{-6}$ mol/L and between $10^{-9}$ and $3 \cdot 10^{-2}$ mol/L for elements which do not have stable isotopes, composed of:

either a saline medium containing 4 mol/L of $NaNo_3$ and $10^{-2}$ mol/L of $NaNO_3$, or an acid medium of an aqueous solution containing 3 mol/L of nitric acid.

In order to determine these distribution coefficients D, 1.5 ml of the aqueous solution containing the metal and 1.5 ml of the organic liquid phase made from chloroform or octanol with a calixarene concentration of $10^{-4}$, $3 \cdot 10^{-3}$, or $10^{-3}$ mol/L are put into contact.

The solutions are put into contact in a 6 ml glass hemolysis tube with stirring at 25° C. After a half hour of contact, the two phases are separated by centrifuging and the activity of each phase is determined by liquid scintillation or by ·, · or · spectrometry.

The calixarene used is $A_5^4$ calixarene according to formula (IV) given above.

Figure 1:
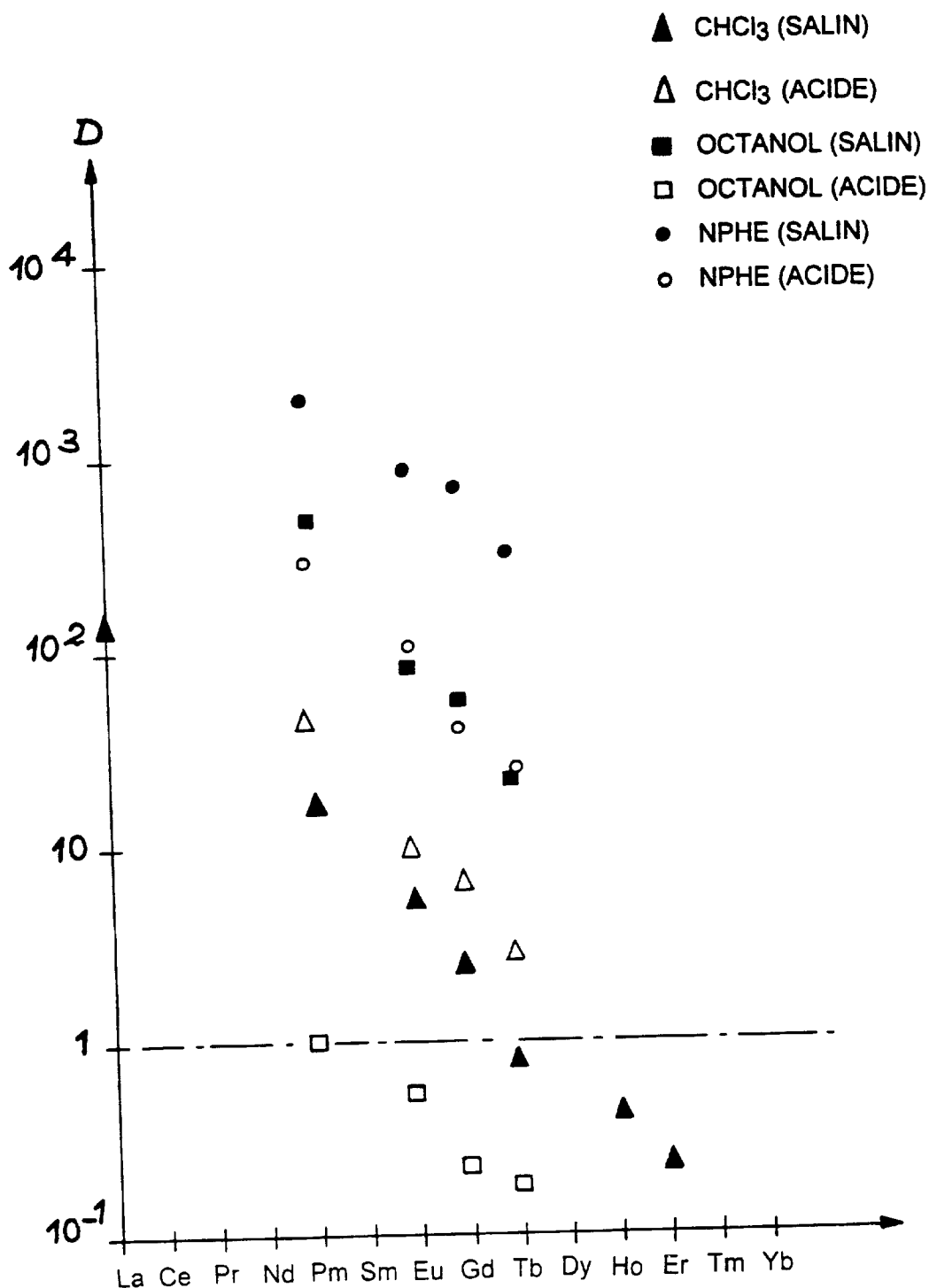
FIG. 1 is a graph illustrating the changes in distribution coefficients of rare earth metals as a function of their ionic radius, for two aqueous starting solutions, three different organic diluents and a calixarene concentration $A_5^4$ of $10^{-4}$ mol/L.
$A_5^4$

FIG. 1 illustrates the results obtained for a calixarene $A_5^4$ concentration of $10^{-3}$ mol/L in chloroform or octanol. It also gives for comparison the results obtained when the diluent is orthonitrophenyl hexyl ether (NPHE) instead of chloroform or octanol.

This figure shows in the abscissa the rare earth elements in descending order of the ionic radii and in the ordinate the distribution coefficients.

The points shown on this figure refer to the results obtained for the aqueous starting solution of saline medium, and for the aqueous starting solution of acid medium ($HNO_3$, 3M).

These points are distinguished by the following symbols:

black triangle: saline medium, diluent $CHCl_3$,
white triangle: acid medium, diluent $CHCl_3$,
black square: saline medium, diluent octanol,
white square: acid medium, diluent octanol,
black circle: saline medium, diluent NPHE,
white circle: acid medium, diluent NPHE, Given these results, it can be seen that the use of a diluent such as chloroform and octanol allows for separation of lanthanides when a $10^{-3}$ mol/L concentration of calixarene is used. This separation is impossible however with the diluent of the prior art, NPHE.

Thus, for a saline medium, metals M1 chosen from La, Am, Ce, Pr, Nd, Pm, Sm, Eu and Gd can be separated.

Figure 2:
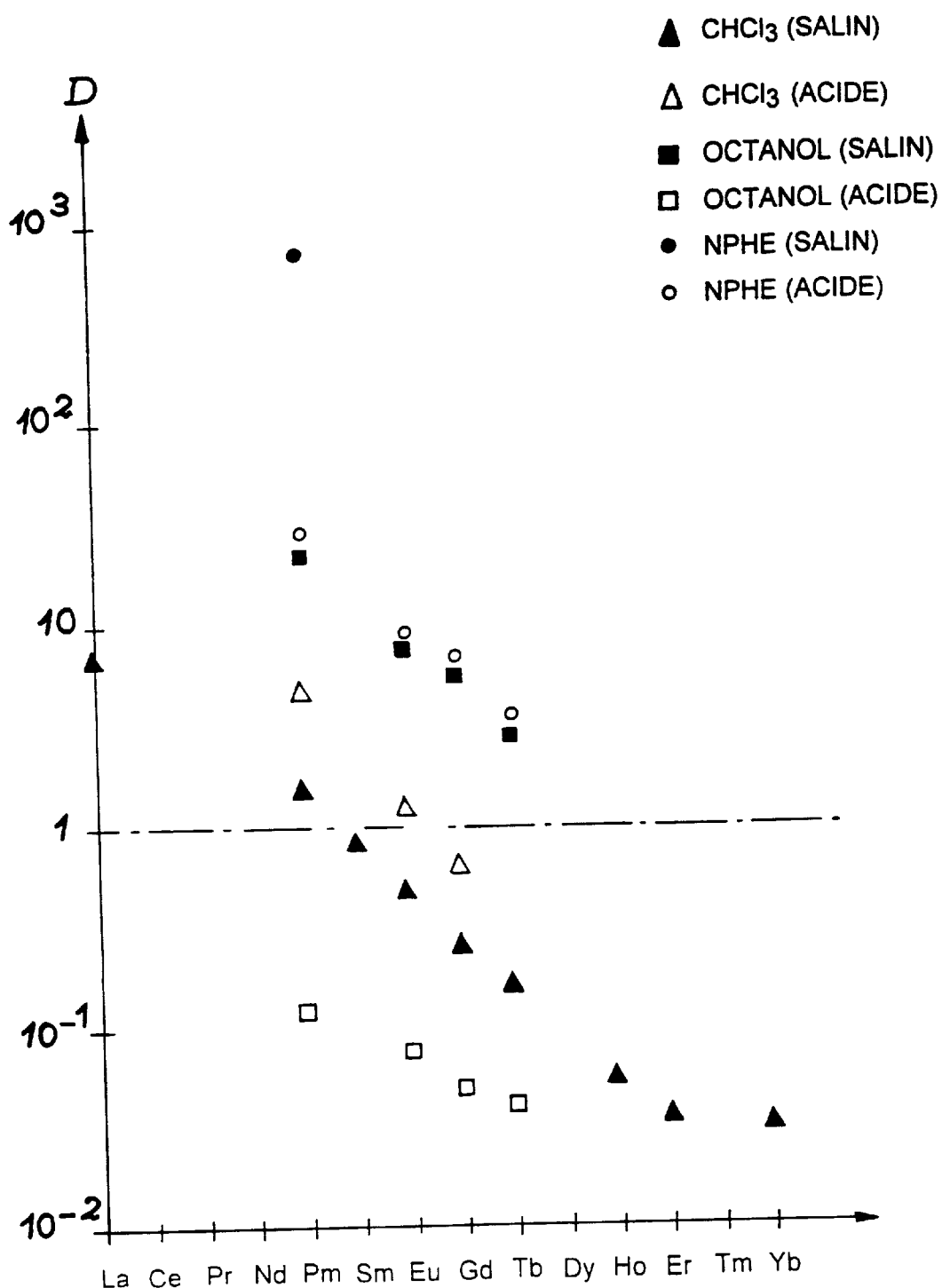
FIG. 2 is a graph also illustrating the changes in distribution coefficients of rare earth metals as a function of their ionic radius, for two aqueous starting solutions, three different organic diluents and a calixarene concentration $A_5^4$ of $3 \cdot 10^{-4}$ mol/L.

FIG. 2 illustrates the results obtained with the same diluents and the same aqueous starting solutions when the $A_5^4$ calixarene concentration is $3 \cdot 10^{-4}$ mol/L.

FIG. 2 also shows that a separation of lanthanides can be done, particularly when chloroform is used as the diluent with a calixarene concentration is $3 \cdot 10^{-4}$ mol/L.

Figure 3:
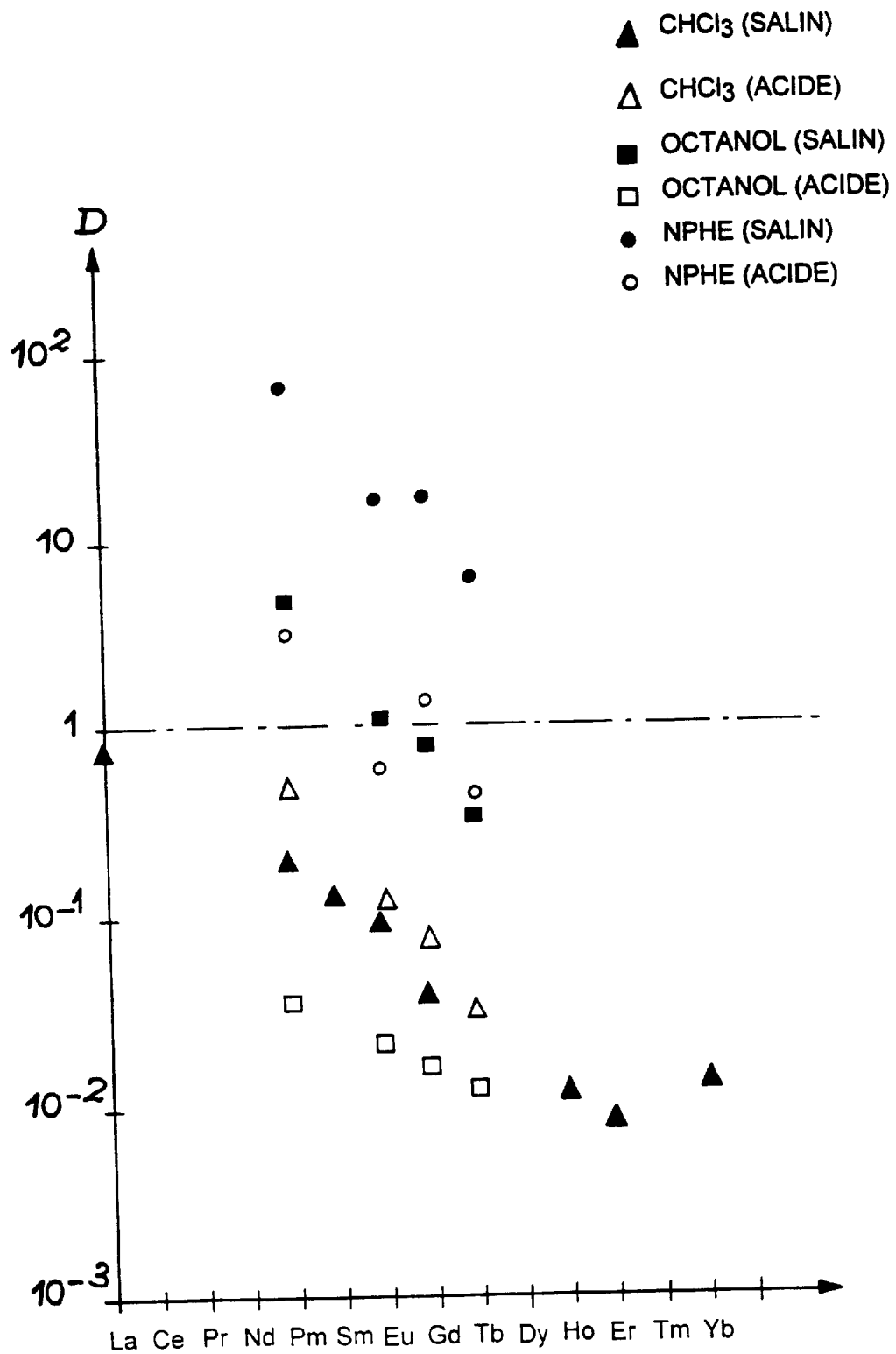
FIG. 3 is a graph illustrating the changes in distribution coefficients of rare earth metals as a function of their ionic radius, for two aqueous starting solutions, three different organic diluents and a calixarene concentration $A_5^4$ of $10^{-4}$ mol/L.

FIG. 3 illustrates the results obtained with a $A_5^4$ calixarene concentration of $10^{-4}$ mol/L.

Examination of FIG. 3 shows that satisfactory lanthanide separation can be obtained using octanol as a diluent.

It is also seen that, in the case of calixarenes, the lighter elements of which the ionic radius is higher are better extracted, the contrary of the results with di(2-ethylhexyl) phosphoric acid used in the prior art which favours extraction of heavy elements with low ionic radii.

Figure 4:
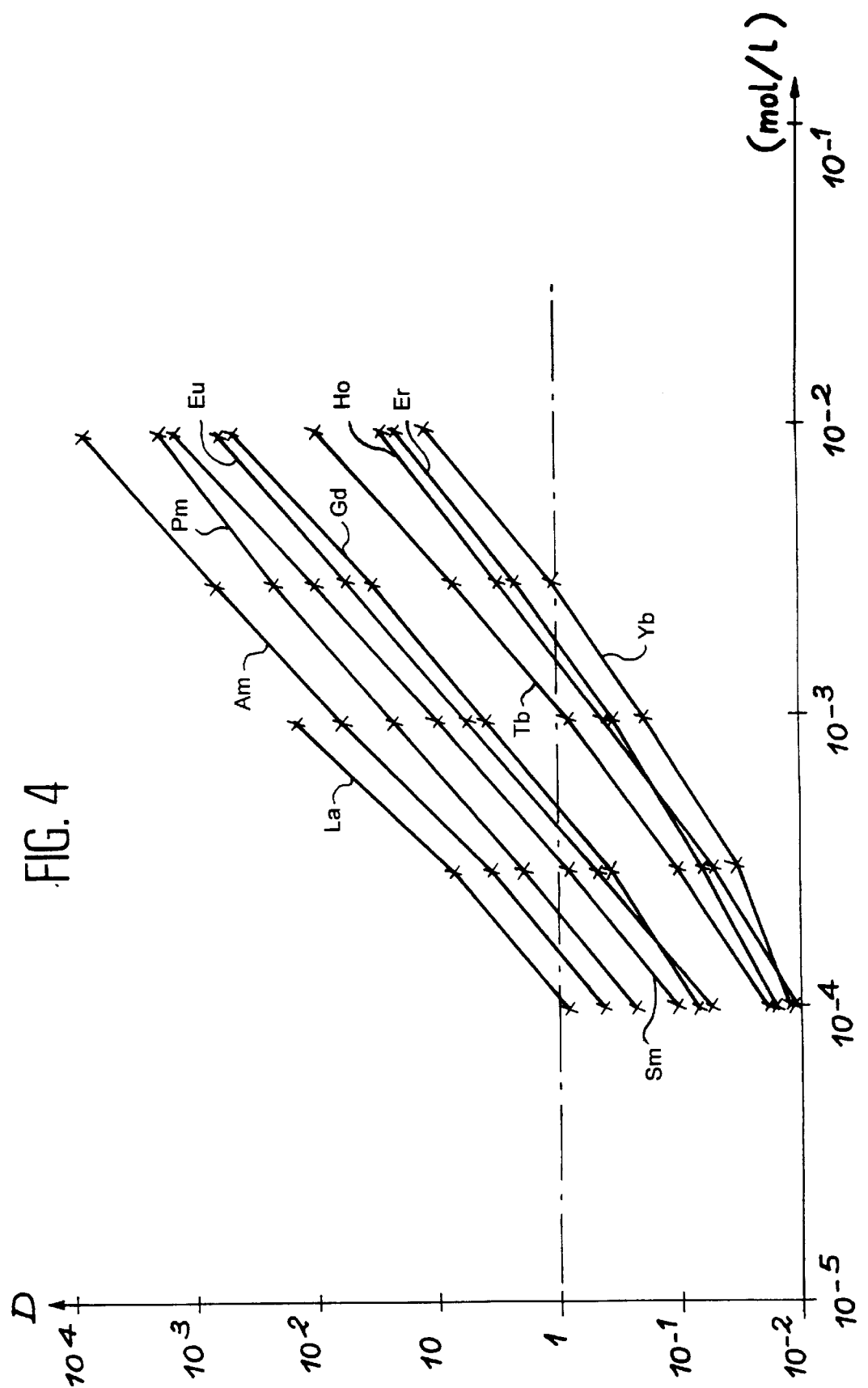
FIG. 4 is a diagram illustrating the variations in distribution coefficient D of La, Am, Pm, Sm, Eu, Gd, Tb, Ho, Er and Yb as a function of the calixarene concentration $A_5^4$ of the organic phase using chloroform as the diluent.

FIG. 4 shows variations of distribution coefficient D as a function of the $A_5^4$ calixarene concentration for elements La, Am, Pm, Sm, Eu, Gd, Tb, Ho, Er and Yb extracted from a saline medium of the same composition as before, using chloroform as the diluent.

Examination of this figure shows that numerous separations can be done by appropriately choosing the calixarene concentration to have a distribution coefficient D greater than 1 for certain elements and a distribution coefficient D less than 1 for other elements.

Thus for a calixarene concentration of $10^{-3}$ mol/L, a very satisfactory separation of lanthanum and ytterbium can be done because the distribution coefficient of lanthanum is in this case 140 while the distribution coefficient of ytterbium is less than 0.19.

For separation of americium and europium, a $A_5^4$ calixarene concentration of $3 \cdot 10^{-4}$ mol/L can be chosen for which $D_{Am}$ is 3.47 while $D_{Eu}$ is $4.72 \cdot 10^{-1}$.

Examination of FIGS. 1 to 3 shows that, in the case of a saline starting medium, metals M1 chosen from the group composed of trivalent lanthanides and actinides Am(III) and Cm (III) can be separated.

In this case, chloroform or octanol can be used as the diluent.

When the aqueous starting solution is an acid solution, metals M1 chosen from La, Ce, Pr, Nd, Pm, Sm and Eu can be separated, for example by using chloroform and a calixarene concentration of $3 \cdot 10^{-4}$ mol/L.

The invention process thus has numerous advantages with respect to the prior process described in FR-A-2 729 958 in which nitrophenyl alkyl ether was used as the diluent and a complexing solution for re-extraction.

Due to the choice of diluent, the calixarene concentration and a slightly acidic aqueous solution used for re-extraction, actinides and lanthanides can be separated from various aqueous media (acidic or saline) without addition of disrupting organic compounds such as complexers.

The examples which follow illustrate separations done by the invention process.

EXAMPLE 1
Separation of Lanthanum and Ytterbium

In this example, these two rare earth elements are separated from an aqueous solution made from a saline medium containing 4 mol/L of $NaNO_3$ and 0.01 mol/L of $HNO_3$.

For this separation, an organic phase made from chloroform is used containing $10^{-3}$ mol/L of calixarene $A_5^4$.

FIG. 1 shows that this separation can be obtained with chloroform using this concentration. For this calixarene concentration, the distribution coefficient of lanthanum is 140 while the distribution coefficient of ytterbium is 0.2

After extraction, the percentage of lanthanum extracted is equal to $$\frac{D}{1+D} * 100$$

99.9% lanthanum and 16.6% ytterbium are thus extracted in the organic phase. Re-extraction can then be done with 0.01 M nitric acid.

EXAMPLE 2
Separation of Lanthanum and Ytterbium

In this example, the same approach as in example 1 is used, but the organic phase is made from chloroform containing $3 \cdot 10^{-4}$ mol/L of the same calixarene.

Examination of FIG. 2 shows that in these conditions, the distribution coefficient of lanthanum is equal to 15 while the distribution coefficient of ytterbium is 0.02.

93.8% lanthanum and 2% ytterbium is thus extracted.

As before, the re-extraction can be done with $10^{-2}$ M nitric acid, thus bringing the composition of the aqueous solution from 50–50% lanthanum and ytterbium to 93% lanthanum and 2% ytterbium.

EXAMPLE 3
Separation of Europium and Gadolinium

In this example, the starting solution is an aqueous solution made from a saline medium with 4 mol/L of $NaNO_3$ and 0.01 mol/L of $HNO_3$.

Referring to FIG. 4, it is seen that the europium/gadolinium separation can be done using as diluent chloroform and a $A_5^4$ calixarene concentration of $4.6 \cdot 10^{-4}$ mol/L.

In these conditions, the distribution coefficient of europium is 1.12 and the distribution coefficient of gadolinium is 0.88. The percentage of europium extracted is thus 52.8% and the percentage of gadolinium extracted is 46.8%. With re-extraction using 0.01 N nitric acid and the aqueous solution undergoing re-extraction (after having added 4 mol/L of $NaNO_3$) an extraction by the same organic phase, then repeating these operations several times, an enrichment of the organic phase in europium is obtained and a good separation.

EXAMPLE 4
Separation of Europium

In this example, the influence of europium and calixarene concentration on the separation of europium from an acid medium ($HNO_3$ 3 M) and/or a saline medium ($NaNO_3$ 4M, $HNO_3$ 0.01 M) is studied. The extraction is done by putting 2 ml of the aqueous solution containing $10^{-6}$ or $10^{-4}$ mol/L of europium with 2 ml of the organic phases composed of $A_3^4$ calixarene of formula (III) dissolved in chloroform in a concentration of $10^{-3}$ or $10^{-2}$ mol/L. The activities of europium in the two phases are determined by counting on 0.5 ml of the organic phase and 1 ml of the aqueous phase to calculate the distribution coefficient D. 1.25 ml of the organic phase then undergoes re-extraction with 2.5 ml of the aqueous re-extraction solution composed of 0.01 M nitric acid. After re-extraction, the europium activities are determined on 0.2 ml of the organic phase and 1 ml of the aqueous phase. The coefficient D for the re-extraction of europium is also determined.

The results obtained are given in table 1 which follows for two concentrations of $A_3^4$ calixarene and two concentrations of europium.

These results show that there are good rates of extraction and re-extraction of europium.

EXAMPLE 5
Separation of Europium

In this example, the influence of the europium concentration, the calixarene concentration and the nature of the starting solution (acid or saline medium) on the extraction of europium are also studied using as calixarene $A_5^4$ of formula (IV) in chloroform, a 0.01 M nitric acid solution for re-extraction and an acid medium or saline medium of the same composition as in example 4.

The following approach is used.

For extraction, 2 ml of the aqueous solution is put in contact with 2 ml of the organic phase, then the activity of europium is determined by counting on 0.5 ml of the organic phase and 1 ml of the aqueous phase. The re-extraction is done with a double volume of aqueous solution by bringing into contact 1.25 ml of the preceding organic phase with 2.5 ml of the aqueous re-extraction solution, and the activity of europium is determined by counting on 1 ml of organic phase and 1 ml of aqueous solution.

The results obtained with two concentrations of $A_5^4$ calixarene, two concentrations of europium and an acid or saline starting medium are given in table 2.

EXAMPLE 6
Separation of Europium

In this example, the influence of the europium concentration and the calixarene concentration on europium extraction is studied from an acid medium or saline medium of the same composition as in example 4 using as calixarene $A_{12}^4$ calixarene of formula (IV).

The same procedure as in example 5 is used except that the re-extraction is done volume to volume using 1.25 ml of organic phase and 1.25 ml of aqueous re-extraction solution.

The results obtained are given in table 3.

EXAMPLE 7
Separation of Europium

In this example, europium is extracted from an aqueous acid or saline solution with the same composition as those given in example 4, using as the organic phase $A_{12}^4$ calixarene of formula (V) in a concentration of $10^{-3}$ mol/L or $10^{-2}$ mol/L in 1-octanol.

The extraction is done by putting 1.5 ml of the aqueous solution in contact with 1.5 ml of the liquid organic phase and the activity of europium is determined by counting on 1 ml of the organic phase and 1 ml of the aqueous phase. Re-extraction of the extracted europium is then done in the organic phase by putting into contact 0.8 ml of the organic phase with 0.8 ml of 0.01 M nitric acid. The activity of the organic and aqueous phases are then determined by counting on 0.5 ml of phase in each case.

The results obtained are given in table 4. These results show that the re-extraction is good when the extraction was done from an acid medium and fairly good in the case of saline medium as long as the calixarene concentration is low.

EXAMPLE 8
Separation of Americium

In this example, the liquid extraction phase of 1-octanol containing 10 mol/L or 10 mol/L $A_{12}^4$ calixarene. The aqueous phase is composed of an acid solution or saline medium of the same composition as that of the preceding examples containing $2 \cdot 10^{-9}$ mol/L of americium.

The extraction is done by bringing 1.5 ml of the aqueous solution into contact with 1.5 ml of the organic phase, then the activity of americium is determined on 100 µl of each phase in 14.9 ml of scintillating liquid. The re-extraction of americium is done by putting 1.25 ml of the organic phase into contact with 2.5 ml of the 0.01 M nitric acid solution and the activity of the two phases is determined after re-extraction on 100 µl of each phase in 14.9 ml of scintillating liquid.

The results obtained are given in table 5.

EXAMPLE 9
Separation of Curium

The same approach as in the preceding examples is used to separate curium from an aqueous acid or saline solution using the same organic phase and the same re-extraction solution.

The results obtained are given in table 6.

EXAMPLE 10
Separation of europium

In this example, europium is separated from an aqueous acid solution (3M nitric acid) or saline solution (4M sodium nitrate) using an organic liquid phase composed of $A_{12}^4$ calixarene in a concentration of $10^{-2}$ mol/L in isotridecanol. In order to dissolve the calixarene in this organic phase, it is first dissolved in a mixture of chloroform and isotridecanol, then the chloroform is evaporated. The extraction and re-extraction are done in the same conditions as those in example 7.

The results obtained are given in table 7.

It is seen that the extraction is excellent for both media and that the re-extraction is better in the case of saline medium.

EXAMPLE 11

Separation of Lanthanum, Samarium, Gadolinium, Holmium, Erbium and Americium.

A liquid organic phase for carrying out this separation can be chosen by referring to FIG. 4 which shows that to extract lanthanum preferentially, a calixarene concentration of $1.41 \cdot 10^{-4}$ mol/L in chloroform should be used. In this case, the distribution coefficients of the elements are the following:

$D_{La}=1.7$ $D_{Sm}=0.21$ $D_{Gd}=0.14$ $D_{Ho}=0.02$ $D_{Er}=0.02$, and $D_{Am}=0.84$ The percentage of the metals extracted are thus:

63% lanthanum

17% samarium

12% gadolinium

2% holmium 1.9% erbium and

45% americium

The processing of the organic phase can be continued by doing a re-extraction and then several new extraction-re-extraction cycles several times to selectively separate lanthanum from the other metals.

Americium is then separated using a $3 \cdot 10^{-4}$ mol/L concentration of calixarene in chloroform. In these conditions, the distribution coefficients of the various elements are as follows:

$D_{Sm}=0.8$ $D_{Gd}=0.4$ $D_{Ho}=0.06$ $D_{Er}=0.05$, and $D_{Am}=3.5$

By thus doing the extraction, the following can be extracted:

78% americium

44% samarium 28.5% gadolinium

6% holmium

5% erbium

This allows for selective extraction of the americium and its separation from the solution after several extraction-re-extraction cycles.

TABLE 1

| Concent. of $A_3^4$ extract. | Concent. of Eu | Medium | Dext. | Dre-ext. | % ext. | % re-ext. |
|---|---|---|---|---|---|---|
| $10^{-3}$ M | $10^{-6}$ M | acid | 19.3 | $6.37 \cdot 10^{-4}$ | 95.1 | 99.9 |
| " | $10^{-4}$ M | acid | 11.9 | $5.78 \cdot 10^{-4}$ | 92.2 | 99.9 |
| $10^{-2}$ M | $10^{-6}$ M | acid | 838 | $4.90 \cdot 10^{-3}$ | 99.9 | 99.5 |
| " | $10^{-4}$ M | acid | $1.08 \cdot 10^3$ | $2.70 \cdot 10^{-3}$ | 99.9 | 99.7 |
| $10^{-3}$ M | $10^{-6}$ M | saline | 4.11 | $1.82 \cdot 10^{-3}$ | 80.5 | 99.8 |
| " | $10^{-4}$ M | saline | 3.93 | $4.70 \cdot 10^{-4}$ | 79.7 | 99.9 |
| $10^{-2}$ M | $10^{-6}$ M | saline | $6.43 \cdot 10^2$ | $3.24 \cdot 10^{-3}$ | 99.8 | 99.7 |
| " | $10^{-4}$ M | saline | $5.94 \cdot 10^{-2}$ | $1.23 \cdot 10^{-3}$ | 99.8 | 99.9 |

TABLE 2

| Concent. of $A_5^4$ Extract | Concent. of Eu | Medium | Dext. | Dre-ext. | % ext. | % re-ext. |
|---|---|---|---|---|---|---|
| $10^{-3}$ M | $10^{-6}$ M | acid | 16.61 | $2.10 \cdot 10^{-3}$ | 94.3 | 99.8 |
| " | $10^{-4}$ M | acid | 10.8 | $7.38 \cdot 10^{-4}$ | 91.5 | 99.9 |
| $10^{-2}$ M | $10^{-6}$ M | acid | $6.53 \cdot 10^2$ | $9.4 \cdot 10^{-3}$ | 99.9 | 99.1 |
| " | $10^{-4}$ M | acid | $9.27 \cdot 10^2$ | $5.48 \cdot 10^{-3}$ | 99.9 | 99.5 |
| $10^{-3}$ M | $10^{-6}$ M | saline | 3.40 | $2.31 \cdot 10^{-3}$ | 77.3 | 99.8 |
| " | $10^{-4}$ M | saline | 3.27 | — | 76.6 | — |
| $10^{-2}$ M | $10^{-6}$ M | saline | $4.77 \cdot 10^2$ | $5.78 \cdot 10^{-3}$ | 99.8 | 99.4 |
| " | $10^{-4}$ M | saline | $6.01 \cdot 10^2$ | $3.96 \cdot 10^{-3}$ | 99.8 | 99.6 |

TABLE 3

| Concent. of $A_{12}^4$ extract. | Concent. of Eu | Medium | Dext. | Dre-ext. | % ext. | % re-ext. |
|---|---|---|---|---|---|---|
| $10^{-3}$ M | $10^{-6}$ M | acid | 22.9 | $4.17 \cdot 10^{-3}$ | 95.8 | 99.6 |
| " | $10^{-4}$ M | acid | 15.1 | $9.30 \cdot 10^{-4}$ | 93.8 | 99.9 |
| $10^{-2}$ M | $10^{-6}$ M | acid | $1.46 \cdot 10^3$ | — | 99.9 | — |
| " | $10^{-4}$ M | acid | $1.18 \cdot 10^3$ | $1.25 \cdot 10^{-2}$ | 99.9 | 98.8 |

TABLE 3-continued

| Concent. of $A_{12}^4$ extract. | Concent. of Eu | Medium | Dext. | Dre-ext. | % ext. | % re-ext. |
|---|---|---|---|---|---|---|
| $10^{-3}$ M | $10^{-6}$ M | saline | 4.90 | $3.80 \cdot 10^{-3}$ | 83.0 | 99.6 |
| " | $10^{-4}$ M | saline | 3.84 | $9.41 \cdot 10^{-4}$ | 79.3 | 99.9 |
| $10^{-2}$ M | $10^{-6}$ M | saline | $5.36 \cdot 10^2$ | $2.10 \cdot 10^{-2}$ | 99.8 | 97.9 |
| " | $10^{-4}$ M | saline | $7.37 \cdot 10^2$ | $6.75 \cdot 10^{-3}$ | 99.9 | 99.3 |

TABLE 4

| Concent. of $A_{12}^4$ extract. | Medium | Dext. | Dre-ext. | % ext. | % re-ext. |
|---|---|---|---|---|---|
| $10^{-3}$ M | saline | 80.8 | $8.2 \cdot 10^{-3}$ | 98.8 | 99.2 |
| $10^{-2}$ M | saline | 1440 | 0.21 | 99.9 | 82.2 |
| $10^{-3}$ M | acid | 0.51 | 0.20 | 33.8 | 83.1 |
| $10^{-2}$ M | acid | 2.53 | 6.7 | 96.2 | 13.0 |

TABLE 5

| Concent. of $A_{12}^4$ extract. | Medium | Dext. | Dre-ext. | % ext. | % re-ext. |
|---|---|---|---|---|---|
| $10^{-3}$ M | acid | 2.4 | 1.4 | 70.5 | 42.3 |
| $10^{-2}$ M | acid | 170 | 7.6 | 99.4 | 1.3 |
| $10^{-3}$ M | saline | 70 | 0.018 | 98.6 | 98.3 |
| $10^{-2}$ M | saline | 2800 | 1.14 | 99.9 | 46.8 |

TABLE 6

| Concent. of $A_{12}^4$ extract. | Medium | Dext. | Dre-ext. | % ext. | % re-ext. |
|---|---|---|---|---|---|
| $10^{-3}$ M | acid | 1 | 0.55 | 50.1 | 64.6 |
| $10^{-2}$ M | acid | 70 | 32.5 | 98.6 | 3.0 |
| $10^{-3}$ M | saline | 280 | 0.011 | 99.6 | 98.9 |
| $10^{-2}$ M | saline | 1 050 | 0.49 | 99.9 | 67.2 |

TABLE 7

| Concent. of $A_{12}^4$ extract. | Medium | Dext. | Dre-ext. | % ext. | % re-ext. |
|---|---|---|---|---|---|
| $10^{-2}$ M | acid | 128 | 9.5 | 99.2 | 9.5 |
| $10^{-2}$ M | saline | 2300 | 0.075 | 99.9 | 93.0 |

What is claimed is:

1. A process for separating at least one metal M1 selected from the group consisting of actinides and lanthanides from at least one other metal M2 selected from the group consisting of actinides and lanides from an aqueous solution containing M1 and M2, comprising:

(a) contacting said aqueous solution containing M1 and M2 with an organic liquid phase comprising (i) at least one caliene of the formula:

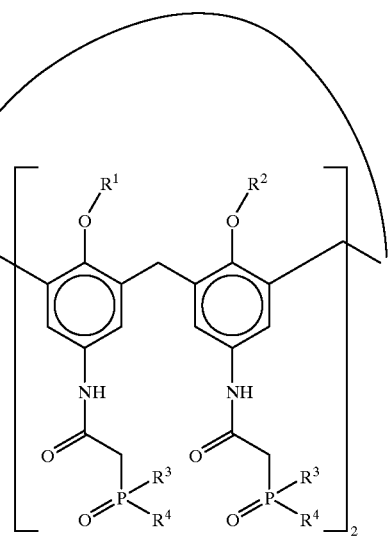

(II)

wherein
R¹ and R², which can be the same or different, are alkyl or o-nitrophenoxyalkyl groups, and
R³ and R⁴, which can be the same or different, are aryl groups; and (ii) an organic diluent selected from tho group consisting of the heavy alcohols and chlorinated solvents,
wherein said organic diluent and the calixarene concentration are such that the distribution coefficient of the metal(s) M1 between said organic liquid phase and said aqueous solution is greater than 1 and the distribution coefficient of the metal(s) M2 between said organic liquid phase and said aqueous solution is less than 1; and (b) separating said aqueous solution from said organic liquid phase.

2. The process according to claim 1, wherein said organic diluent is such that for a calixarene concentration in the organic phase of $10^{-4}$ to $10^{-3}$ mol/L, the distribution coefficient of gadolinium between said organic phase and an aqueous solution of gadolinium is from 0.5 to 5.

3. The process according to claim 1, wherein said organic diluent is chloroform or octanol.

4. The process according to claim 3, wherein said organic diluent is chloroform or octanol.

5. The process according to claim 1, wherein the concentration of calixarene(s) in said organic phase is $10^{-4}$ mol/L to $5 \cdot 10^{-2}$ mol/L.

6. The process according to claim 1, wherein R¹ and R² are alkyl groups of 3 to 18 carbon atoms and R³ and R⁴ represent the phenyl group.

7. The process according to claim 1, further comprising:

(c) re-extracting the metals extracted into said organic liquid phase by contacting said organic liquid phase separated in (b) with an aqueous solution of a mineral acid having a pH less than or equal to 4.

8. The process according to claim 7, wherein said aqueous solution of a mineral acid is a nitric acid solution with a nitric acid concentration of $10^{-4}$ to $10^{-1}$ mol/L.

9. The process according to claim 1, wherein said aqueous solution is a saline solution, and the metals M1 are selected from the group consisting of trivalent lanthanides, Am(III) and Cm(III).

10. The process according to claim 9, wherein said organic diluent is chloroform or octanol.

11. The process according to claim 1, wherein said aqueous solution is acidic, and the metal(s) M1 are selected from the group consisting of La, Ce, Pr, Nd, Pm, Sm and Eu.

12. The process according to claim 11, wherein said organic diluent is chloroform and the calixarene concentration is $3 \cdot 10^{-4}$ mol/L.

13. The process according to claim 1, wherein M1 is americium, M2 is europium, said aqueous solution is a saline solution, said organic diluent is chloroform, and the calixarene concentration is $3 \cdot 10^{-4}$ mol/L.

* * * * *